O. M. Pike,

Water Wheel,

N° 80,874.

Patented Aug. 11, 1868.

Witnesses:
Wm A. Magan
S. C. Cotton

Inventor:
O. M. Pike
by Munn & Co
Attorneys

United States Patent Office.

O. M. PIKE, OF NORTH LEVERETT, MASSACHUSETTS, ASSIGNOR TO HIMSELF AND S. S. GRAVES, OF THE SAME PLACE.

*Letters Patent No. 80,874, dated August 11, 1868.*

IMPROVEMENT IN WATER-WHEELS.

*The Schedule referred to in these Letters Patent and making part of the same.*

TO ALL WHOM IT MAY CONCERN:

Be it known that I, O. M. PIKE, of North Leverett, in the county of Franklin, and State of Massachusetts, have invented a new and useful Improvement in Water-Wheels; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

This invention relates to a new and improved horizontal water-wheel.

It consists in combining with the wheel a slotted cylinder or drum, constructed and arranged in such a manner that the cylinder is made to serve as a stop to the water, and effectually prevent any water from passing through the wheel-case, except that which acts upon the buckets of the same.

In the accompanying sheet of drawings, A represents a vertical shaft, and B the wheel, securely keyed thereon, the wheel being composed of a cylinder or drum, a, having buckets b on its exterior, of curved or spiral form.

The wheel is partially enclosed within a case, C, the latter being concentric with the wheel, and extending around about one-half its circumference.

On the wheel-shaft A, above the wheel, there is a toothed wheel, D, which gears into a corresponding wheel, E, on one end of a horizontal shaft, F, the latter having a wheel, G, precisely similar to E, on its opposite end.

Figure 1:
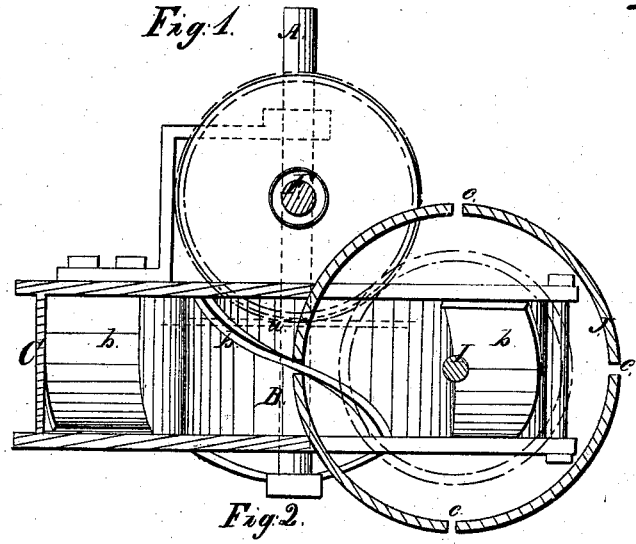
Figure 1 is a vertical section of my invention, taken in the line $x\,x$, fig. 2.
Figure 2:
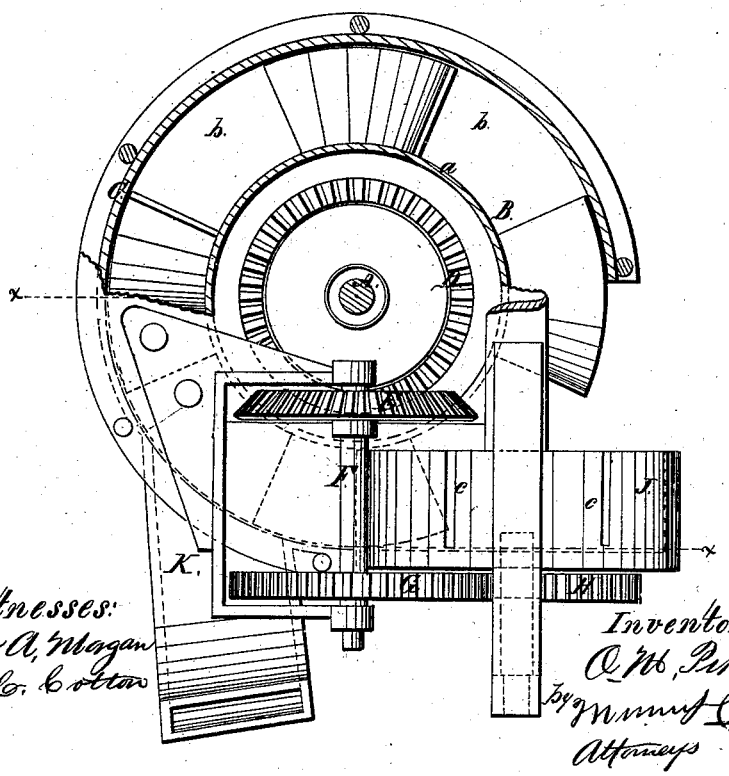
Figure 2 is a plan or top view of the same.

The wheel G gears into a wheel, H, on a shaft, I, the latter having a drum or hollow cylinder, J, upon it, the periphery of which is slotted in a direction parallel with its shaft or axis, as shown at c; said slots being at such a distance apart as to admit of the buckets passing through them as the wheel rotates, (see fig. 1.)

The periphery of the drum J completely closes the end of the case C, and joining the chute K, through which the water enters the case, and effectually prevents any water passing out of the case at that point. All the water, therefore, that enters the case must act upon the buckets; there can be no other escape for it, except in its regular passage through the case.

The drum or cylinder J is rotated from the wheel-shaft, by means of the gearing described, so that the upper ends of the bucket b will enter a slot, c, as they reach the inner side of the drum or cylinder J. It will be seen, therefore, that said drum or cylinder serves as a stop for the water, and insures the full force or action of the same against the buckets, so that a large percentage of the power of the water is obtained.

Having thus described my invention, I claim as new, and desire to secure by Letters Patent—

The rotary slotted drum or cylinder J, in combination with the wheel B and case C, all constructed and arranged to operate in the manner substantially as and for the purpose set forth.

O. M. PIKE.

Witnesses:
L. E. TORREY,
M. A. GRAVES.